United States Patent [19]
Ryan

[11] 3,832,428
[45] Aug. 27, 1974

[54] ARTICLES HAVING INTEGRAL TRANSPARENT OR TRANSLUCENT PANELS

[75] Inventor: James Ernest Ryan, Knebworth, England

[73] Assignee: Imperial Chemical Industries Limited, London, England

[22] Filed: June 8, 1972

[21] Appl. No.: 260,728

[52] U.S. Cl. .................................. 264/48, 161/160
[51] Int. Cl. ........................................... B29d 27/03
[58] Field of Search .................... 264/48, 41, 45, 51

[56] References Cited
FOREIGN PATENTS OR APPLICATIONS
1,181,604   2/1970   Great Britain ....................... 264/48

Primary Examiner—M. J. Welsh
Attorney, Agent, or Firm—Cushman, Darby & Cushman

[57] ABSTRACT

A method for making a shaped article having at least one integral transparent or translucent panel, the method comprising forming a blank of a cellular thermoplastic polymeric material by polymerising the continuous phase of an emulsion having an aqueous disperse phase and a continuous phase comprising one or more polymerisable liquids, then removing the water from the cellular polymeric material so formed over at least the area where the panel is desired; and pressing the blank at a temperature above the softening point of the polymeric material between two dies shaped and positioned to define the desired panel so as to remove the cellular structure of the blank therebetween and form a substantially non-cellular panel.

8 Claims, No Drawings

ARTICLES HAVING INTEGRAL TRANSPARENT OR TRANSLUCENT PANELS

The invention relates to a method of forming shaped articles composed of thermoplastic polymeric materials extended in a cellular form, and to the provision of one or more integral transparent or translucent panels in the articles.

It was proposed in British Patent specification No. 1,181,604 to form panels in small foamed food containers, such as egg boxes, by the use of elevated temperatures and pressures. However it is seen from the patent specification that even with very thin sheets of a blown polystyrene foam only one-eighth of an inch (3 mm) thick, very high pressures of 18,000 psi (about 1240 bar) were required at 250°F in order to attain sufficient clarity to enable the food subsequently placed in the container to be viewed. The areas, however, were very small, and it would appear that if it was desired to extend the method described to large panels in a much thicker sheet, e.g. a glazed panel in a door or room divider, the cost of equipment for producing such very high pressures over the much larger areas, would be very high indeed. It has now been found that fusible water-extended polymers, when dry, may be readily coalesced under much lower pressures to form very clear transparent panels, and this may be applied to much larger scale applications of the kind referred to above.

According to the present invention, a method is provided for making a shaped article having at least one integral transparent or translucent panel, the method comprising forming a blank of a cellular thermoplastic polymeric material by polymerising the continuous phase of an emulsion having an aqueous disperse phase and a continuous phase comprising one or more polymerisable liquids, then removing the water from the cellular polymeric material so formed over at least the area where the panel is desired; and pressing the blank at a temperature above the softening point of the polymeric material between two dies shaped and positioned to define the desired panel so as to remove the cellular structure of the blank therebetween and form a substantially non-cellular panel.

Because of its fine cellular structure, the walls between adjacent cells of a water-extended polymer are generally correspondingly thin. This gives rise to a surface texture which is readily scored, and it is therefore preferred for most applications to strengthen one or more exposed surfaces by fusing a layer underlying the surface of the blank to form a skin. This may be accomplished by pressing the surface of the blank with a plate at a temperature above the softening point of the polymeric material sufficiently to fuse the layer to the desired depth of skin, cooling the plate to harden the skin and subsequently withdrawing the plate. The blank preferably has its skin (if any) formed on its exposed surfaces before the panels are formed, but this is not essential where a heated panel-forming die is used. The skin surface will generally conform to the surface of the plate so that a glozzy, matt or textured surface may be provided by using a suitably surfaced plate. The skin may be formed on all or only part of the exposed surfaces as desired.

The panel may be formed by first forming a skin on both sides of the blank over at least the areas where the panel is to be formed, heating the blank to a temperature above its softening point and pressing the heated blank between the two panel-forming dies to remove the cellular structure therebetween. The dies are preferably maintained at a temperature below the softening point of the polymeric material so that there is then no necessity for a die cooling stage before the dies are withdrawn from the blank. A die temperature of about 30°C below the softening point is generally suitable. This method of forming the panel must of necessity have a short pressing time since the operation must be completed before the blank cools too far to be workable. Pressing times of 30 s or less are generally suitable, depending largely on the rate at which the press is capable of bringing together the panel-forming dies.

The temperature to which the blank must be heated depends on the dimensions of the blank and rate at which the press can form the panel. The temperature must be such that the blank stays softened sufficiently long to enable the panel to be formed, but preferably is not excessively above that minimum temperature so that the polymeric material may harden as soon as possible after the panel has been formed. Since the optimum temperatures are clearly dependent on the materials and dimensions peculiar to each specific case, they are best found by experimentation; but as a general rule, temperatures which are normally used for vacuum forming non-cellular sheets of the selected polymeric material, may usually be suitable in the present method as the temperatures to which the blanks are preheated prior to the forming of the panels.

The thickness of the panel formed in this manner appears to be approximately the combined thickness of the two surface skins, and accordingly the panel thickness may be largely predetermined when the skins are formed.

An alternative manner in which the panels may be formed comprises pressing the dried blank between the two panel-forming dies with at least one of the dies at a temperature above the softening point of the polymeric material so as to remove the cellular structure of the polymeric material therebetween, cooling the dies to harden the polymeric material, and subsequently withdrawing the dies. The panel may be formed simultaneously with the formation of a skin on the cellular structured part of the article, but it is generally preferred to form the skin (if a skin is required) before the panel is formed.

The time in which the blank must reside in the press is much longer when using the hot die than when using the cool die method. For example, with a hot die, the formation of a panel in a glazed 4 cm sheet of extended polymethyl methacrylate may typically require about 3 min, plus a further period of cooling dependent on the construction of the press used and its temperature control system (compared with the 30 s quoted hereinabove with the cool die). However, the entire panel forming operation may be accomplished in the press when using the hot die, and does not require ancilliary ovens or similar heating means in which to soften the blank prior to pressing.

The panels formed by the two operations may be very similar in transparency and general appearance, but there may be differences around the edges. The hot die operation is capable of producing very good definition with very sharply defined edges to the panels. In general the same die used cold on a hot blank will produce more rounded edges with the surface of the article curving down to the surface of the panel. If desired, a smoothly curved edge having similar dimensions to the edges produced by a cold die, may also be obtained using a hot die having a suitably curved face. However, since the hot die then relies on fusing a progressively increasing depth of cellular material, it causes a progressively increasing depth of transparent glaze. Such variation in depth of glaze does not normally occur at the smoothly curved edge surrounding a panel formed using a cold die. In both cases, edge detail, such as imitation beading around an integral transparent panel in a door, may be formed during the panel-pressing operation by using a suitably shaped die. As above, this may be more sharply defined by the hot die at the expense of having a thicker transparent glaze on the surface of the edge detail.

For both hot and cool dies, similar pressures may be used, but these will depend on the cycle times, the temperatures employed and the ease with which at that temperature the cellular structure of the polymeric material may be displaced laterally, or fused and collapsed between the dies. Because of the difficulty in providing high pressures over large areas it is preferable to adjust the other parameters so that relatively low pressures may be used. For example, for methyl methacrylate polymers at temperatures of about 140°C or using a die at 170° – 180°C, pressures in the range of about 14 – 70 bar (about 200 – 1000 psi) are generally found to be suitable. These pressures apply to the very uniform and fine cell structure obtained by using sufficient quantities of efficient emulsifiers, such as those described hereinafter. Any coarser cells amongst the fine cells are more difficult to remove, and may require higher pressures.

For articles whose surfaces are not parallel sided, it is advantageous to cast the blank with parallel sides over the area of the desired panel. With particularly thick blanks, a thinner region for subsequent panel formation may be formed during the original casting of the blank. However, this has not generally been found necessary for forming panels in sheets up to 6 cm thick which were provided with a skin before the panels were formed, the thickness after skin formation being about 4 cm.

Suitable liquid monomers include monoethylenically unsaturated compounds such as styrene, methyl-, ethyl- and butyl-methacrylate or acrylate, or vinyl acetate, although monomers such as vinyl chloride, and vinylidene chloride which exist in the gaseous state at room temperature, can be subjected to superatmospheric pressure in order to liquefy them, and the emulsion and subsequent polymerisation can then be carried out using these monomers. To operate this invention, it is important that the material be truly thermoplastic, by which we mean that the material may be made to flow under stress when heated sufficiently above its softening point. Materials which will not so flow because, for example, they are too highly cross-linked, will not produce a transparent panel of high clarity and may not even produce a translucent panel. It is therefore important to avoid monomers which would form a highly cross-linked polymer. However it has been found that small amounts of cross-linking may be tolerated. Methyl methacrylate is particularly suitable for use in the present invention because of the relative ease with which water will diffuse through its polymers and co- polymers, giving rise to more ready and rapid removal of the water from the cellular structure prior to the formation of the panels. Hence it is preferred that the monomers by predominantly methyl methacrylate, i.e. at least 80 percent by weight of the polymerisable liquids.

The physical properties of the polymerised material may be adjusted by copolymerising suitable monomers with the predominant monomer. Thus for example, both glazing and panel formation may be facilitated by copolymerising with the methyl methacrylate up to 20 percent of a bulky acrylate such as 2-ethyl hexyl acrylate, generally about 10 percent by weight being most suitable, the percentages being based on the total weight of polymerisable liquid.

The emulsifier selected may be any of those which will stabilise a water-in-oil emulsion provided it will not cause cross-linking, or provided it is used in amounts sufficiently small to cause only an insignificant amount of cross-linking. For stabilising emulsions having particularly high water contents, unsaturated polyesters have been found particularly effective, but since these tend to cause cross-linking the quantities used are preferably restricted to the minimum quantity needed to stabilise an emulsion of the desired water content. The preferred emulsifiers are unsaturated polyesters based on a propoxylated bisphenol A such as 2,2-bis-(4-(2-hydroxy)-prop-1-oxy phenyl)propane having the formula

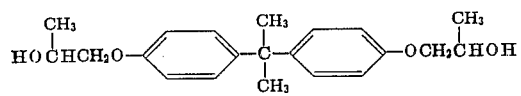

suitably condensed with maleic or fumaric acids, or with a mixture of such acids. Because of the tendency to cross-link the polymer formed, it is preferred to use it in quantities not exceeding 5 percent by weight of the continuous phase, and with the preferred bisphenol A-based polyesters, this has been found sufficient to stabilise emulsions containing as high as 90 percent by weight of water, particularly in the presence of a base, as described further hereinbelow. In respect of the lower emulsifier quantities, for 60 percent by weight of water about 0.5 percent by weight of the polyester may be sufficient, but for higher water contents this quantity should be increased. For water contents in the range 70 – 80 percent by weight of the emulsion, quantities of the preferred polyester emulsifiers in the range 1 to 2 percent by weight of the continuous phase are found to be convenient. Other polymeric emulsifiers have previously been suggested, being polymers which are soluble in the liquid monomer and which will form a turbid phase on adding a few drops of the aqueous liquid to the solution, e.g. polystyrene polymerised in the presence of a persulphate as stabiliser for methyl methacrylate emulsions. Any such emulsifier which is capable of emulsifying the desired quantity of water may be used as alternatives to the preferred polyesters described above, subject to the minimising of any undesirable cross-linking.

The unsaturated polyesters referred to above are most efficient when used in the presence of a basic compound to neutralise at least some of the free acid of the polyester. It is preferred to use an excess of the basic compound. When using cold setting recipes incorporating accelerators such as dimethyl-p-toluidine, the basic organic compounds such as the ethanolamines, particularly triethanolamine are generally suitable. However, when using recipes cured at elevated temperatures without accelerators being present, inorganic basic compounds, especially sodium and potassium hydroxides, are preferred.

Polymeric material may be added to the composition in addition to that used as emulsifier. In this manner the properties of the final material may be modified, or the time required to effect the cure may be reduced. In the latter case, the preferred additional polymers are the polymerised product of the monomers used e.g. a polymethyl methacrylate for use with methyl methacrylate monomer. The additional polymer may be added either before or after emulsification as desired, and a particularly convenient method of obtaining the additional polymeric material is to partially cure the monomer before adding the other components, i.e., before adding the emulsifier and the aqueous phase.

The catalyst selected, depends on the monomer and emulsifier used and on the temperature at which the monomer is to be polymerised, but must be a catalyst capable of operating in the presence of water. For example peroxy catalysts such as tert-butyl perpivolate, benzoyl peroxide, and 2,4-dichloro benzoyl peroxide are generally suitable. When using elevated temperatures, accelerators are not generally required, but where elevated temperatures are not necessary, by using an accelerator such as dimethyl-p-toluidine or dimethyl aniline in conjunction with a peroxy catalyst such as benzoyl peroxide, the monomer may be polymerised without the application of heat. In this way a fast reaction may be used without the monomer boiling from the polymerisation exotherm, and consequently a low molecular weight may be obtained. In general, low molecular weight materials are desirable in that they form the panels more readily, but for some applications this may have disadvantageous side effects such as reduced resistance to crazing.

The emulsion may contain a dye to impart colour to the panel. Where the surface of the article also has a glazed skin, a similar effect of colour may then be obtained although an unglazed surface will generally have a whitish appearance. Fillers may also be incorporated where special effects are desired. For example, chopped rovings of glass fibres may be used to provide the panel with an attractive translucent appearance. Other non-fibrous fillers may be used to obtain translucency in a panel which has been pressed to remove all the cellular structure, and which would therefore otherwise to transparent. Translucency may also be obtained by incomplete collapse of the cellular structure, but it is generally less easy to adjust the temperature and pressure so as to obtain consistently the desired degree of translucency, than it is to incorporate specific quantities of fillers.

The blanks in which the panels are formed may be homogeneous, but interesting effects can be achieved by using laminates formed, for example, by sequential casting techniques or by laminating two or more individually cast sheets of different colours. In sequential casting techniques, an initial layer is cast, and when the initial layer has cured at least sufficiently to retain its identity, one or more subsequent layers of emulsion may be added and then cured in contact with the previous layer. Individually cast sheets may be laminated using adhesives, but care is required to ensure that any adhesive used does not show in the subsequently produced panel. However, the laminate is preferably formed during the process of forming the panels, simply by placing together two or more layers of differently coloured cellular polymeric material to form the blank, and then pressing the layers together between the two panel-forming dies so as to form superimposed panels in the layers. The layers will generally adhere together, and where the underlying layer is not excessively in excess of the area of the panel, or where there are a plurality of panels distributed over the area of the two layers, no adhesive is generally required to hold the layers together. Laminates may also contain one or more layers of noncellular thermoplastic foils.

By using a laminated blank, the panel may have a different colour (being the combination of the two colours) from that of the surrounding cellular material of the side from which it is viewed. This is particularly effective when illuminated from behind. It is generally preferable in a laminate comprising an overlying layer and an underlying layer, to make the panel in the overlying layer transparent, so as to minimise any obscuring of the underlying layer, but where a light source is to be obscured, the underlying layer may be translucent.

The panel may be formed in a plane part way between the planes of the two surfaces of the blank, but for some display purposes and the like, it may be visually more attractive to form the panel so as to be continuous with one surface of the blank, the other surface of the blank being indented to form the panel. The simplest method of forming such a panel is to provide as one of the dies, a large plate for supporting the blank, and to form the panel by pressing a smaller die into the blank from the other side. The supporting plate may, however, be flat or curved, glossy or embossed, as desired, so long as the surrounding cellular material is thereby supported. Laminated blanks may also have panels displaced to one surface in the same manner as the homogeneous blanks. These may give the effect when illuminated from behind, of an article having a smoothly continuous surface in which back-lighted panels have a different colour from that of the main opaque body of the article.

The invention is useful for the manufacture of building elements such as room dividers, doors, or like partitions, having integral translucent or transparent panels. Antiglare panels in the building elements may be formed from laminates incorporating light absorbant or polarising fillers or dyes. Alternatively, thin layers of metals such as copper may be condensed on to the panel. This may be protected by applying the metal to one thin sheet of cellular polymer the size of the panel, and laminating this onto the basic sheet of the blank as the panel is formed, with the metal layer sandwiched between the sheets. However, for more uniform layers, heat stable thermoplastic foil having a layer of the metal, may be preferred, and may be laminated as the panel is formed. Other articles which may be manufactured using the present invention, include decorative lighting, illuminated direction indicators, road signs and advertising, particularly for point of sale advertising, all of which are particularly applicable to formation from laminated blanks incorporating two or more colours.

The invention is illustrated by the following examples.

EXAMPLE 1

A water-in-oil emulsion having a ratio of water to oil of approximately 2:1 was prepared by slowly adding the water with constant stirring to an oil phase comprising methyl methacrylate containing 10 percent by weight of polymethylmethacrylate (to produce a more viscous syrup having a shorter gel time), using as emulsifying agent 2 percent by weight of a commercial crystalline polyester resin consisting of 2/1 propoxylated bisphenol A/propylene glycol on maleic anhydride, together with 2 percent by weight of triethanolamine. The oil was catalysed by 2 percent by weight of benzoyl peroxide (added in diluted form as 4 percent by weight of a mixture of benzoyl peroxide and an inert filler in equal proportions by weight) together with 1.6 percent by weight of dimethyl-p-toluidine.

The initiated emulsion was then poured into a mould about 30 cm square, to a depth of approximately 6 mm. The emulsion was allowed to cure without any heat being applied, the cure time being about 25 min. After a period of about 30 min, the hardened article was removed from the mould, the article comprising a rigid slab of water-filled cellular material. The slab was then left overnight in an oven at a temperature of 80°C, under vacuum, in order to remove the bulk of the trapped water. On its removal from the vacuum oven, the article comprised a cellular material having very even small cells filled with air.

The article was then placed between two 10 cm square plates having temperatures of about 150°C. The plates were pressed against the opposing surfaces of the article with a pressure of 22 bar (320 psi) for about 10 mins to produce a panel having a reduced thickness in the centre of the article. The original thickness of about 6 mm was reduced to approximately 2 mm, with a smooth transition at the edges. While the cellular part of the article appeared to be completely opaque, the thinner non-cellular panel was substantially transparent, and small newsprint viewed through the panel could be seen distinctly.

EXAMPLE 2

A door having a transparent panel was cast using a cold setting recipe. The continuous oil phase of the emulsion consisted of 2 percent by weight of "Atlac" 382 E (a dipropoxylated bisphenol A fumarate (1:1) polyester, marketed by Honeywill-Atlas Limited, and having an acid number of 12), 2 percent by weight of triethanolamine, 2 percent by weight of benzoyl peroxide (added as 4 percent of a 50 percent solution), 0.8 percent by weight of dimethyl-p-toluidine, and methyl methacrylate up to the total 100 weight percent. Water was added with continuous stirring using an 8 cm diameter poppy-head dispersator to produce a stable emulsion containing 75 percent by weight of water as the disperse phase, the remainder being the above oil phase.

The initiated emulsion was then poured into a rectangular mould to a depth of about 6 cm and left for about 45 min, after which time the methyl methacrylate had cured. The sheet was removed and dried in an oven for 2 days at 95°C and a further 15 days at 100°C. A long drying cycle had been found necessary because of the thickness of the sheets, but the cycle used could possibly have been reduced since this reduced the water content to about 0.04 percent by weight of water, but no difficulty was experienced in forming a skin or a panel in sheets which had been left exposed for several weeks and which would then have been expected to have a water content of the order of 4 percent by weight. The cellular structure had a very even fine-celled appearance, the cell size being of the order of 2 to 5 μm.

After drying, the sheet was pressed between two flat plates at 160°C and 14 bar (200 psi) for about 10 s. A skin was formed on both sides of the sheet, and the overall thickness of the sheet was reduced to about 4 cm. A small panel approximately 10 × 20 cm was formed by pressing between two dies of the desired size and maintained at 175°C. Both dies were advanced into the sheet with a pressure of 17 bar (250 psi) at the die face, for 3 min, and then cooled to harden the polymer. On withdrawal of the dies after cooling, a very clear transparent panel was left. The panel had a thickness of about 5 mm and was located about half way through the sheet, with the depressions left in both sides having sharply defined walls which appeared to be substantially orthogonal to the glazed surface of the sheet.

EXAMPLE 3

A door similar to that of Example 2 was formed in the same mould, but using a hot-setting recipe. The continuous oil phase consisted of 2 percent by weight of "Atlac" 382 E, 0.1 percent by weight of sodium hydroxide, 0.3 percent by weight of 2,4-dichlorobenzoyl peroxide, 10 percent by weight of 2-ethyl hexyl acrylate, and the balance to 100 weight percent of methyl methacrylate. The oil was emulsified with warm water to give an emulsion at a temperature of 46°C containing 75 percent by weight of water as the disperse phase. The emulsion was immediately poured into the mould, again to a depth of 6 cm, and then placed in an oven at 55°C for about 3 hours. After removal from the mould, the resultant sheet was dried in an oven at 95°C for 1 day and then 110°C for 11 days. The cell structure appeared to be slightly coarser than that of the previous Example.

The blank produced was more difficult to glaze than that of Example 2, but by increasing the pressure to 48 bar (700 psi), and the temperature to 170°C, a good clear skin was again formed in 2 min. Once glazed, however, it appeared that the panel could be formed as easily as that in the previous Example, again using a die temperature of 175°C and a pressure of 17 bar for 3 min before cooling. The resultant panel was very similar to that produced in Example 2.

EXAMPLE 4

The panel-forming methods using hot and cool dies were compared using the cold setting recipe of Example 2 with the water content of the emulsion reduced to 70 percent by weight. The emulsion was cast to form two identical sheets a little over 3 cm thick, but because the sheet was thinner than that of Example 2 a much shorter drying cycle could be used, being 95°C for about 12 hours and a further 4 days at 100°C. A surface skin about 2 mm thick was formed on both surfaces, reducing the overall sheet thickness to about 2.3 cm.

The panel-forming dies for the two sides of the blank were dissimilar, one being a flat supporting plate while the other, which will be referred to as "the die," was of much smaller cross-sectional area, the die being arranged to press into a blank supported on the plate. The die consisted of two coaxial cylindrical portions, an end portion having a diameter of 6 cm and a length of 6 mm, and a second portion 10 cm in diameter, integral with the end portion, the diameter of the die changing from one portion to the next as a sharp step orthogonal to the surfaces of the cylinders. The end face of the end portion had an engraved pattern in the form of V sectioned channels of varying depths within the approximate range of 0.5 – 2 mm. The same die was used for both experiments.

Hot die. With the blank at ambient temperature, and the die at 175°C, the die was pressed into the blank with a pressure of 17 bar (250 psi), the total force being increased as required when the step reached the surface of the blank. After 3 min the die was cooled to harden the polymethyl methacrylate.

The panel was continuous with one surface of the blank on the side supported by the plate, while in the other surface was a stepped depression through to the panel. Both the rim of the depression and the edge of the step were sharply defined, with the cylindrical sides of the depression apparently having reproduced faithfully the sides of the cylindrical portions of the die. The surface of the step had a noticeable increase in the thickness of the glazed skin. The panel was transparent with a slight haze.

Cold die. The blank was heated for 30 min in an oven maintained at 140°C, and the die was warmed to about 70°C. On removal from the oven the blank was pressed by the die for 30 s, the die then being withdrawn.

The resultant sheet again had the panel displaced towards one surface so as to be continuous with the surface of the remainder of the sheet, the surface being flat and glossy. When viewed from the flat side, the panels formed using the hot and cool dies looked very similar, the embossed pattern being clearly seen when illuminated from behind, in both cases. The panel formed with the cool die was, however slightly thicker and correspondingly slightly hazier. The slight haze was believed to be due to a small quantity of foreign matter, and in neither case did there appear to be any remaining cellular structure in the panel.

When viewed from the indented side of the sheet, the edge of the step was only slightly more rounded than that of the earlier sheet, but the rim of the depression was much more smoothly curved, possibly due to the further cooling before pressing. The total diameter of the rim of the depression was about 12 cm. The embossed pattern formed by the grooves in the die had lost some of the sharpness of the V shape compared with those formed using the hot die. The surface of the step showed little, if any, increase in the thickness of the surface skin, in contrast to the increased glaze obtained when using the hot die.

EXAMPLE 5

This experiment was carried out to illustrate the use of fillers in forming translucent panels. To the oil phase of Example 3 was added about 1 percent by weight of chopped glass rovings, and this was extended in an emulsion containing 70 percent by weight of water as the disperse phase. A blank, 4 cm thick was cast from the emulsion using the same cycle as in Example 3, and then dried. A skin was formed in both surfaces of the blank, to reduce the overall thickness to 3 cm. Using two dies maintained at 175°C and shaped to produce a flat panel with integral imitation beading at its edges, the blank was pressed from both sides with a pressure of 17 bar (250 psi) to form a panel 3 mm thick.

The panel was translucent and no distant objects could be distinguished through it. However, fine print held against the reverse face of the panel could clearly be read. The glass fibres could be clearly distinguished, and provided an attractive appearance.

EXAMPLE 6

This experiment was carried out to show the use of laminates in the formation of direction signs and the like.

Two sheets of unglazed, dried water-extended polymer were produced using the recipe and cycle of Example 3, except that a red monomer-soluble die was added to one of the emulsions. The two sheets were placed together, and their outward faces glazed. The resultant glazed pair of sheets had a total thickness of about 4 cm with glazed skins of about 2 mm, the two sheets having approximately the same thickness.

In a similar manner to that of Example 4, the panel was formed using a supporting plate and a die shaped as an arrow with a 3 cm wide shaft. The sheet without the dye was placed on the supporting plate with its glazed skin downwards, and the red sheet on top with its glazed skin uppermost. The die, maintained at 175°C, was pressed downwards with a pressure of 17 bar, for 3 min, cooled for a further 10 min and withdrawn.

When viewed from the side of the uncoloured material, with illumination behind the sheets, the red arrow appeared in the middle of a white opaque area, the panel being flush with the surface of the uncoloured (white) sheet. The two sheets were firmly bonded together. The opaque area was slightly discoloured by free radical absorbers in the polyester, but this had been minimised by initial washing with aqueous sodium hydroxide.

I claim:

1. A method for making a shaped article having at least one integral transparent or translucent panel, comprising polymerising the continuous phase of an emulsion having an aqueous disperse phase and a continuous phase comprising one or more polymerisable liquids to form a cellular thermoplastic polymeric material, removing the water from the cellular polymeric material so formed over at least the area where the panel is desired, and pressing the polymeric material at a temperature above the softening point of the polymeric material between two dies shaped and positioned to define the desired panel so as to remove the cellular structure of the polymeric material therebetween and form a substantially non-cellular panel.

2. A method according to claim 1 in which one or more exposed surfaces of the polymeric material is strengthened by fusing a layer underlying said surface of the polymeric material to form a skin, the method comprising pressing the surface of the polymeric material with a plate at a temperature above the softening point of the polymeric material sufficiently to fuse the layer to the desired depth of skin, cooling the plate to harden the skin and subsequently withdrawing the plate.

3. A method according to claim 2 in which the skin is formed on exposed surfaces of the polymeric material before the panel is formed therein.

4. A method according to claim 3 which comprises forming a skin on both sides of the polymeric material over at least the areas where the panel is to be formed, heating the polymeric material to a temperature above its softening point and pressing the heated article between the two panel-forming dies to remove the cellular structure therebetween.

5. A method according to claim 4 in which the panel-forming dies are maintained at a temperature below the softening point of the polymeric material.

6. A method according to claim 1 which comprises pressing the polymeric material between the two panel-forming dies with at least one of the dies at a temperature above the softening point of the polymeric material so as to remove the cellular structure of the polymeric material therebetween, cooling the dies to harden the polymeric material, and subsequently withdrawing the dies.

7. A method according to claim 1 in which the emulsion contains fillers in sufficient quantities for panels formed in the consequential polymeric material to be translucent.

8. A method according to claim 1 in which the polymeric material is in the form of a laminate.

* * * * *